United States Patent
Shaked et al.

(10) Patent No.: US 12,463,782 B2
(45) Date of Patent: *Nov. 4, 2025

(54) FREQUENCY DEPENDENT RESIDUAL SIDE BAND CORRECTION

(71) Applicant: QUALCOMM Incorporated, San Diego, CA (US)

(72) Inventors: Ronen Shaked, Kfar Saba (IL); Gideon Shlomo Kutz, Ramat Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 427 days.

This patent is subject to a terminal disclaimer.

(21) Appl. No.: 18/069,632

(22) Filed: Dec. 21, 2022

(65) Prior Publication Data
US 2024/0214155 A1   Jun. 27, 2024

(51) Int. Cl.
*H04L 5/00* (2006.01)
*H04B 1/68* (2006.01)

(52) U.S. Cl.
CPC ............. *H04L 5/0053* (2013.01); *H04B 1/68* (2013.01); *H04L 5/0092* (2013.01)

(58) Field of Classification Search
CPC ........ H04B 17/21; H04B 1/68; H04B 1/0071; H04B 7/06956; H04L 25/03159; H04L 2025/03815; H04L 25/03; H04L 27/04; H04L 27/38; H04L 7/0079; H04L 5/0098; H04L 5/0048; H04L 27/02; H04L 7/0091; H04L 5/0053; H04L 27/364; H04L 27/368; H04L 25/03006; H04L 5/0092; H04L 5/0051
See application file for complete search history.

(56) References Cited

U.S. PATENT DOCUMENTS

| | | | | |
|---|---|---|---|---|
| 5,654,982 | A * | 8/1997 | Goodson | H04L 27/38 |
| 7,783,293 | B2 * | 8/2010 | Tujkovic | H04B 7/069 |
| 11,924,009 | B1 * | 3/2024 | Shaked | H04L 5/0098 |
| 2010/0330929 | A1 * | 12/2010 | Heutmaker | H04B 1/00 455/73 |
| 2014/0307654 | A1 * | 10/2014 | Kim | H04L 5/0048 |
| 2014/0307684 | A1 * | 10/2014 | Cha | H04L 5/0048 370/329 |
| 2021/0336833 | A1 * | 10/2021 | Horn | H04L 1/0067 |
| 2022/0182126 | A1 * | 6/2022 | Dutta | H04L 5/0051 |
| 2024/0214083 | A1 | 6/2024 | Shaked et al. | |
| 2024/0214155 | A1 * | 6/2024 | Shaked | H04B 1/68 |

FOREIGN PATENT DOCUMENTS

WO    2021066696 A1    4/2021

* cited by examiner

*Primary Examiner* — Lana N Le
(74) *Attorney, Agent, or Firm* — Harrity & Harrity, LLP

(57) ABSTRACT

Various aspects of the present disclosure generally relate to wireless communication. In some aspects, a user equipment (UE) may transmit a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The UE may receive an indication of FDRSB correction that is based at least in part on the FDRSB training signal. Numerous other aspects are described.

30 Claims, 11 Drawing Sheets

FREQUENCY DEPENDENT RESIDUAL SIDE BAND CORRECTION

FIELD OF THE DISCLOSURE

Aspects of the present disclosure generally relate to wireless communication and to techniques and apparatuses for frequency dependent residual side band (FDRSB) correction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common communication protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The method may include receiving an indication of FDRSB correction that is based at least in part on the FDRSB training signal.

Some aspects described herein relate to a method of wireless communication performed by a network node. The method may include receiving an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The method may include transmitting an indication of FDRSB correction that is based at least in part on the FDRSB training signal.

Some aspects described herein relate to a UE for wireless communication. The user equipment may include a memory and one or more processors coupled to the memory. The one or more processors may be configured to transmit an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The one or more processors may be configured to receive an indication of FDRSB correction that is based at least in part on the FDRSB training signal.

Some aspects described herein relate to a network node for wireless communication. The network node may include a memory and one or more processors coupled to the memory. The one or more processors may be configured to receive an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The one or more processors may be configured to transmit an indication of FDRSB correction that is based at least in part on the FDRSB training signal.

Some aspects described herein relate to a non-transitory computer-readable medium that stores a set of instructions for wireless communication by a UE. The set of instructions, when executed by one or more processors of the UE, may cause the UE to transmit an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The set of instructions, when executed by one or more processors of the UE, may cause the UE to receive an indication of FDRSB correction that is based at least in part on the FDRSB training signal.

Some aspects described herein relate to a non-transitory computer-readable medium that stores a set of instructions for wireless communication by a network node. The set of instructions, when executed by one or more processors of the network node, may cause the network node to receive an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The set of instructions, when executed by one or more processors of the network node, may cause the network node to transmit an indication of FDRSB correction that is based at least in part on the FDRSB training signal.

Some aspects described herein relate to an apparatus for wireless communication. The apparatus may include means for transmitting an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The apparatus may include means for receiving an indication of FDRSB correction that is based at least in part on the FDRSB training signal.

Some aspects described herein relate to an apparatus for wireless communication. The apparatus may include means for receiving an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The apparatus may include means for transmitting an indication of FDRSB correction that is based at least in part on the FDRSB training signal.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
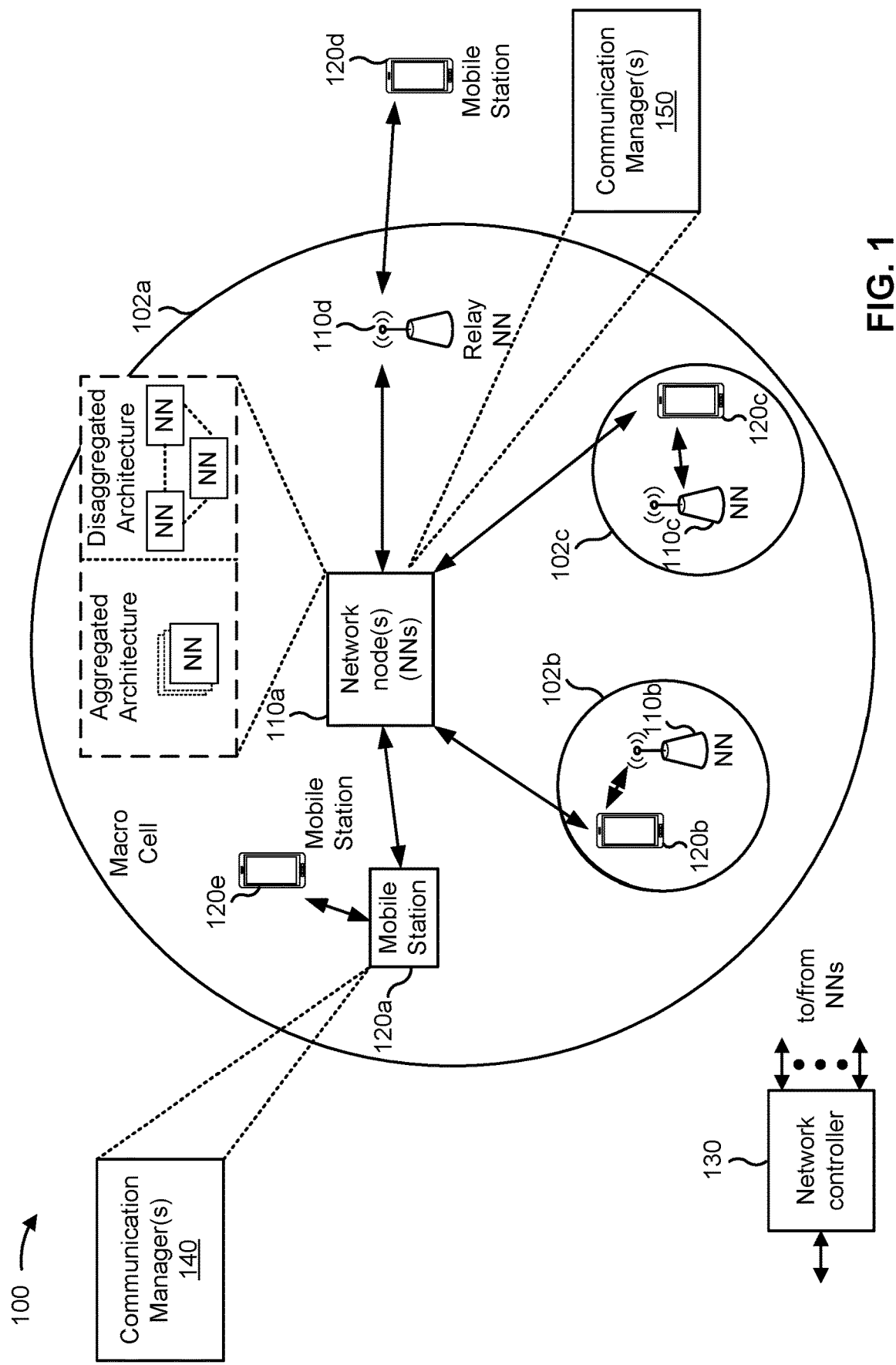
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and receive an indication of FDRSB correction that is based at least in part on the FDRSB training signal. Additionally, or alternatively, the communication manager 140 may perform one or more other operations described herein.

In some aspects, the network node 110 may include a communication manager 150. As described in more detail elsewhere herein, the communication manager 150 may receive an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and transmit an indication of FDRSB correction that is based at least in part on the FDRSB training signal. Additionally, or alternatively, the communication manager 150 may perform one or more other operations described herein.

As indicated above, FIG. 1 is provided as an example. Other examples may differ from what is described with regard to FIG. 1.

Figure 2:
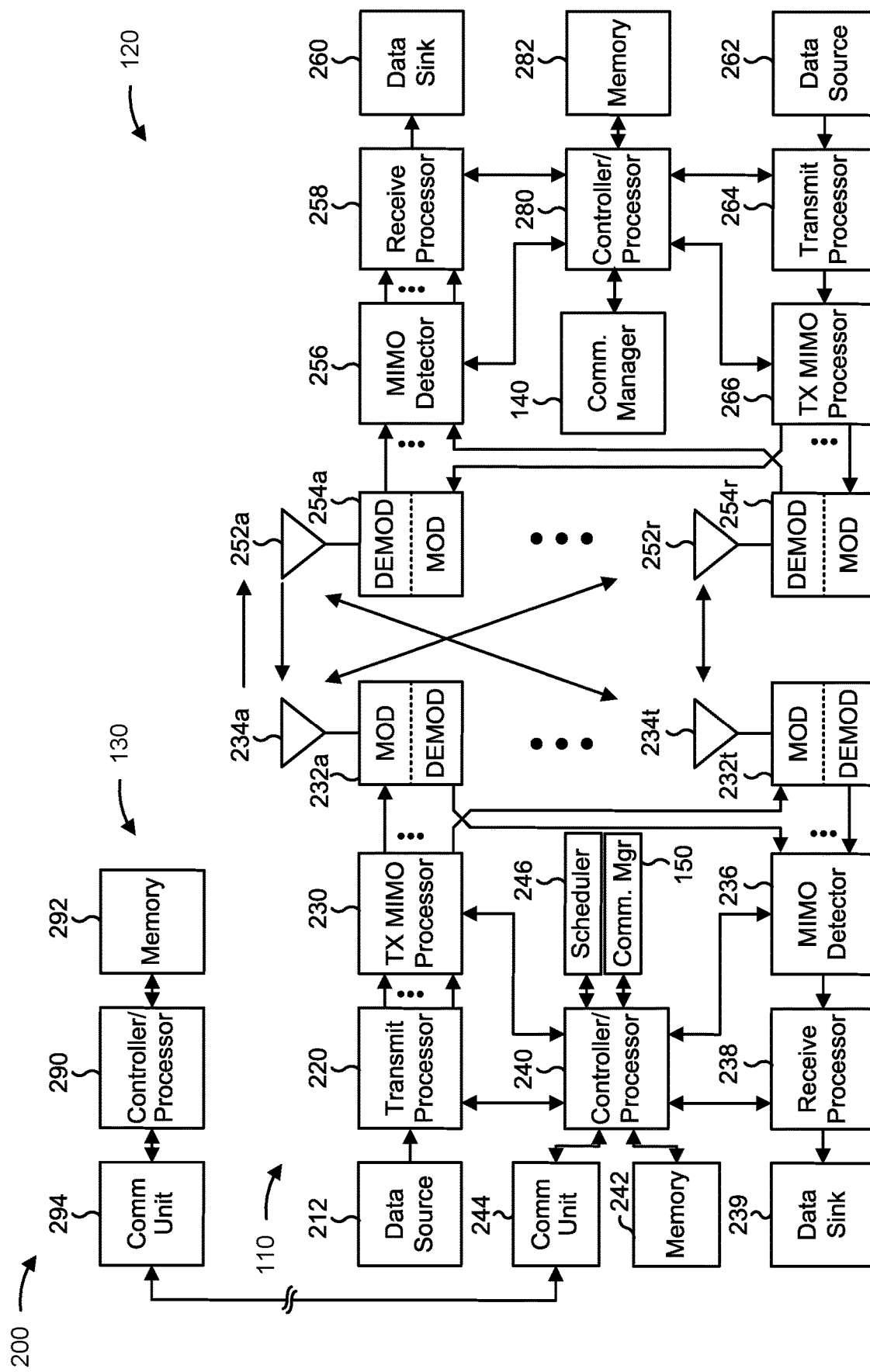
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with FDRSB correction, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for transmitting an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and/or means for receiving an indication of FDRSB correction that is based at least in part on the FDRSB training signal. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and/or means for transmitting an indication of FDRSB correction that is based at least in part on the FDRSB training signal. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
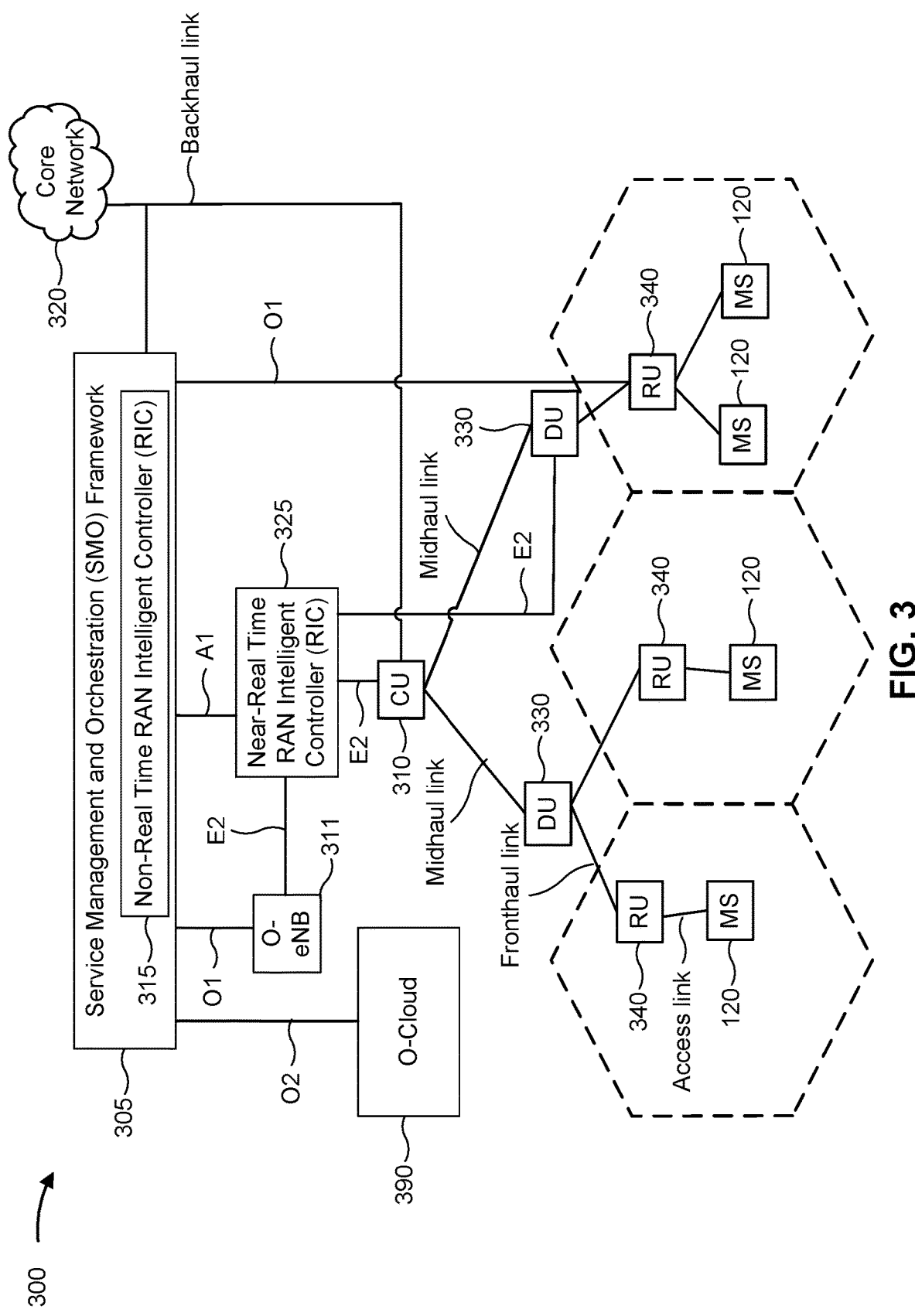
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
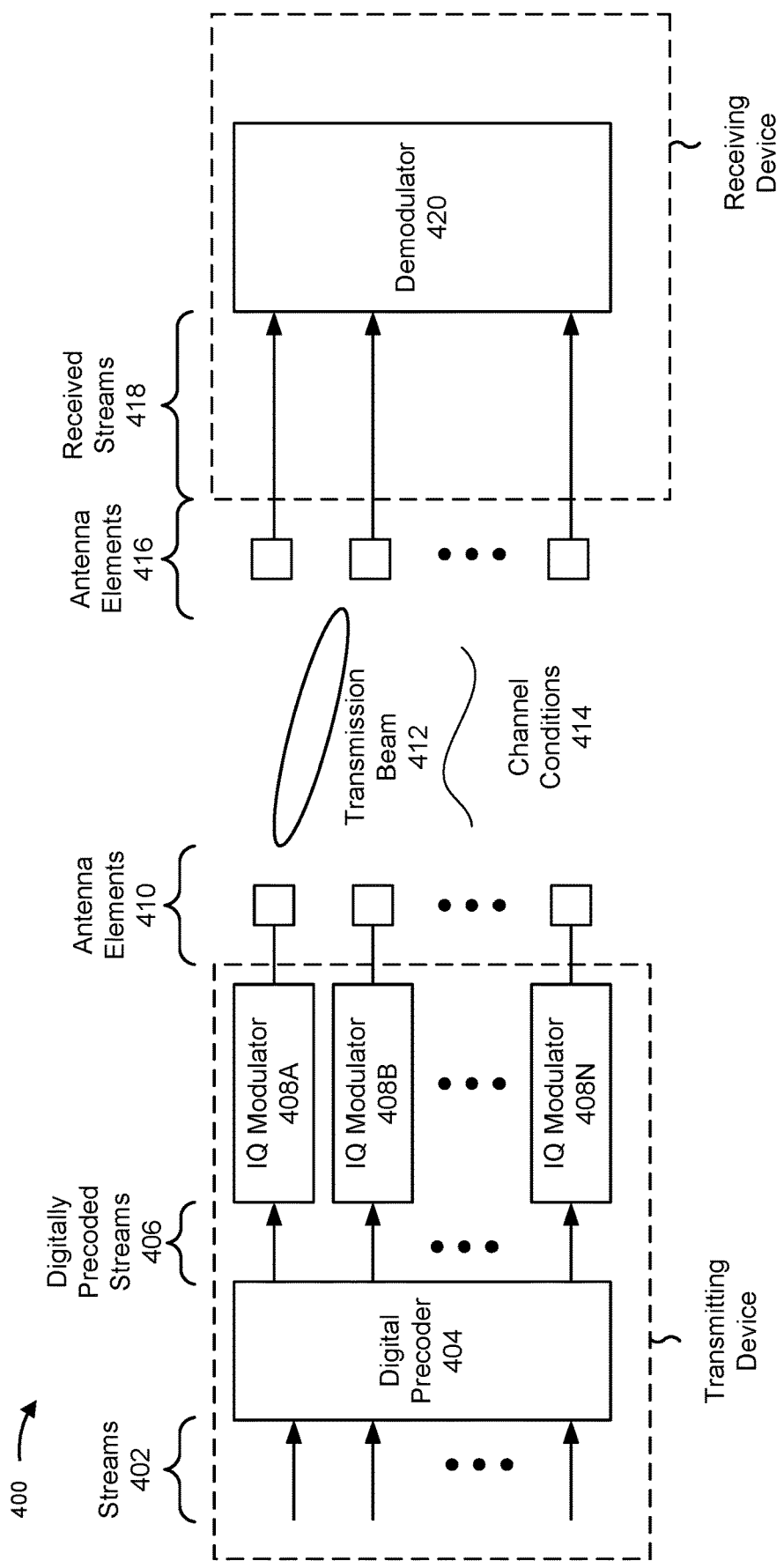
FIG. 4 is a diagram illustrating an example of a communication having frequency dependent residual side band (FDRSB), in accordance with the present disclosure.

FIG. 4 is a diagram illustrating an example 400 of a communication having FDRSB, in accordance with the present disclosure. As shown in FIG. 4, a transmitting device may transmit a communication to a receiving device. The transmitting device may use multiple antenna elements (also referred to as "antennas") to transmit the communication using beamforming. The communication may include signals transmitted via multiple time-frequency resources (e.g., via multiple subcarriers and/or resource blocks on one or more symbols and/or slots).

As shown in FIG. 4, the transmitting device may receive multiple streams 402 for transmission to the receiving device. The streams may include data and/or control signaling for transmission to the receiving device. A digital precoder 404 may receive the streams 402 and apply precoding to the streams 402. After applying the precoding to the streams 402, the digital precoder 404 may output digitally precoded streams 406.

A set of IQ modulators 408 (e.g., IQ modulators 408A through IQ modulators 408N) may receive the digitally precoded streams 406 from the digital precoder 404 (e.g., directly or indirectly). The IQ modulators 408 may modulate the digitally precoded streams 406 to map bits of the digitally precoded streams 406 to constellation points associated with bit values of the digitally precoded streams 406. For example, the IQ modulators 408 may apply modulation based at least in part on applying amplitudes, in a Q (quadrature) dimension and an I (in-phase) dimension in an IQ plane, according to an MCS of communications to the receiving device. However, the IQ modulators 408 may cause FDRSB (e.g., an IQ mismatch, an FDRSB impairment, and/or FDRSB error) to the digital precoded streams 406 based at least in part on, for example, imperfections of the IQ modulators 408. This FDRSB may cause signaling on a first subcarrier to interfere with a second subcarrier that is a mirror of the first subcarrier about a carrier frequency. For example, the first subcarrier may be a distance from the carrier frequency in a positive direction (e.g., above the carrier frequency), and the second subcarrier may be the same distance from the carrier frequency in a negative direction (e.g., below the carrier frequency).

The IQ modulators 408 may provide modulated signals associated with the digitally precoded streams 406 to antenna elements 410 for transmission over the air to the receiving device. Based at least in part on digital precoding, the antenna elements 410 may transmit the modulated signals associated with the digitally precoded streams 406 via a transmission beam 412. In some examples, the antenna elements 410 may transmit the modulated signals via one or more transmission beams 412. As the modulated signals propagate over the air to the receiving device, channel conditions 414 may affect the modulated signals. For example, the channel conditions 414 may affect a signal-to-noise ratio (SNR) and/or a signal-to-interference-plus-noise ratio (SINR) of the modulated signals as received at the receiving device.

The receiving device may receive the modulated signals having effects from channel conditions 414. Additionally, based at least in part on transmission using the IQ modulators 408, the modulated signals may have FDRSB. The antenna elements 416 may provide received streams 418 (e.g., the modulated signals having effects of channel conditions 414 and FDRSB) to a demodulator 420. In some examples, the demodulator 420 may be unable to correctly demodulate the received streams 418 based at least in part on the FDRSB associated with the IQ modulators 408. In these examples, the receiving device and the transmitting device may consume power, processing, power, and/or communication resources to detect and correct demodulation errors or failures in the received streams 418. For example, the receiving device may provide hybrid automatic repeat request (HARQ) acknowledgment (HARQ-ACK) feedback to indicate a demodulation and/or decoding error, which may trigger a retransmission of communications associated with the streams 402.

As indicated above, FIG. 4 is provided as an example. Other examples may differ from what is described with regard to FIG. 4.

In some examples, IQ mismatch (also referred to as FDRSB) is an inherent impairment of an IQ modulator. Cancellation of this impairment may improve link performance by, for example, improving support for MCSs with improved spectral efficiency and/or reducing error rates of communications.

A UE may use multiple antenna groups (e.g., groups of one or more antenna elements), with the multiple antenna groups each connected to a different IQ modulator. The UE may not support estimation of transmission FDRSB (e.g., FDRSB of a signal transmitted by the UE) based at least in part on cost and complexity. For example, to support estimation of transmission FDRSB, the UE may use dedicated hardware including an RF feedback chain for each IQ modulator. The UE may sample transmitted signals using the RF feedback chain, apply an analog-to-digital conversion, and then perform FDRSB estimation and correction.

In some aspects described herein, a UE may transmit a training signal to a network node from which the network node may estimate FDRSB correction for a composite of all used transmission antenna groups and provide feedback (e.g., OTA) to the UE. The UE may use the feedback to correct the FDRSB with reduced cost and complexity, relative to internal estimation of the FDRSB within the UE.

Based at least in part on using OTA FDRSB feedback and correction, the UE may correct a composite FDRSB, which may not be supported by a UE performing internal estimation of the FDRSB based at least in part on the UE not having knowledge of a channel transfer function as observed by the network node.

In some aspects described herein, the UE may transmit an FDRSB training signal that is configured to capture wideband FDRSB and enable simple OTA feedback to the UE (e.g., as identified by a correction filter of the network node). For example, the FDRSB training signal may occupy a first set of subcarriers that are lower than a carrier frequency and a second set of subcarriers that are higher than the carrier frequency. A mirror of the first set of subcarriers about the carrier frequency being non-overlapping with the second set of subcarriers.

In some aspects, the UE may request a resource grant for transmission of the training signal (also referred to as a training symbol, which may be an OFDM symbol allocated for transmission of the FDRSB training signal on frequency resources of the OFDM symbol). The network node may transmit an indication of a slot at which the UE may transmit the training signal. The network node may receive the training signal and transmit feedback of a calculated FDRSB correction filter (e.g., FDRSB correction).

In some aspects, FDRSB over an entire bandwidth may be identified by allocating just a single symbol. In some aspects, multiple symbols may be allocated to improve processing gain.

The UE may decide at which periodicity to ask for a grant of assistance with FDRSB estimation. In some aspects, removing an FDRSB estimation burden from the UE conserves power resources of the UE.

A width (e.g., in a frequency domain) of the FDRSB training signal may depend on a bandwidth used for transmissions by the UE (e.g., for transmissions of data and/or other communications). This improves accuracy of FDRSB correction relative to an FDRSB signal that is narrower than the bandwidth used for transmission by the UE and reduces power consumption relative to an FDRSB signal that is wider than the bandwidth used for transmission by the UE.

Based at least in part on the network node estimating a composite of the FDRSB (e.g., a total of FDRSBs from all UE antenna groups used by the UE) an estimation and correction dimension may be reduced relative to estimating the FDRSB per transmission chain and correcting per transmission chain.

Based at least in part on using the composite of the FDRSB, the estimation and correction are dependent on a precoder and/or beamformer. For this reason, the FDRSB estimation and correction should be updated if the uplink precoder changes.

Each of the IQ modulators may be impaired with FDRSB impairment, which can be modeled as: $Z_i[k]=S[k]+F_i[k]\cdot S^*[-k]$, where $S[k]$ is a training signal in an FD (frequency domain) and $F_i[k]$ is the FDRSB impairment of an i-th modulator.

The received signal on the network node side includes $Z_i[k]$ after passing a beam-former and a channel:

$$Y[k] = \sum_i Z_i[k]\underbrace{\sum_j P_{ij}[k]H_{ij}[k]}_{G_i[k]} = \sum_i Z_i[k]G_i[k]$$

Substituting $Z_i[k]$ yields:

$$Y[k] = \sum_i (S[k]+F_i[k]\cdot S*[-k])G_i[k] = S[k]\underbrace{\sum_i G_i[k]}_{C_{main}[k]} + S*[-k]\underbrace{\sum_i G_i[k]F_i[k]}_{C_{FDRSB}[k]}$$

On the network node side, the equalizer may cancel the main channel $C_{main}[k]$ yielding:

$$Y_{out}[k] = C_{main}^{-1}[k]\cdot Y[k] = S[k] + S*[-k]\cdot \frac{C_{FDRSB}[k]C_{main}^{-1}[k]}{C_{FDRSB.post.eq}[k]}$$

For the network node to estimate the composite FDRSB as observed post equalization $C_{FDRSB.post.eq}[k]$, the training signal $S[k]$ may be transmitted having, for example, even sub-carriers only for positive frequencies (frequencies above a carrier frequency) and of odd sub-carriers only for negative frequencies (frequencies below the carrier frequency). In other examples, the training signal $S[k]$ may take different shapes as long as each sub-carrier sees vacant mirror subcarrier. For example, the training signal may be transmitted with a resolution of 3 (e.g., transmitted on every 3rd subcarrier), 4 (e.g., transmitted on every 4th subcarrier), or another number. The resolution may balance improved accuracy by having a smaller resolution, and conservation of processing and power resources by having a higher resolution. However, FDRSB has relatively small variation over adjacent subcarriers, so there may not be a need for a dense population of subcarriers carrying the FDRSB training signal. In some aspects, the resolution may account for one or more additional optimizations, such as channel traffic, network noise, and/or interference, among other examples.

This way, the FDRSB impairment, which is reflected on mirror sub-carriers, would leak into a vacant tone. This allows estimation of $C_{FDRSB.post.eq}[k]$. The composite FDRSB filter may be estimated by measuring a response over mirror subcarriers (e.g., mirror tones).

Once the network node has estimated a frequency response of a composite FDRSB, the network node may calculate an FDRSB correction filter and provide the FDRSB correction to the UE.

Calculating the FDRSB correction filter may include $Y_{out}[k]=(S[k]+S*[-k]\cdot C_{FDRSB.correction}[k])+(S*[-k]+ S[k]\cdot C_{FDRSB.correction}*[k])\cdot C_{FDRSB.post.eq}[k]==S[k](1+ C_{FDRSB.correction}*[k]C_{FDRSB.post.eq}[k])+S*[-K] (C_{FDRSB.correction}[k]+C_{FDRSB.post.eq}[k])$. The FDRSB can be cancelled when choosing the correction filter to be $C_{FDRSB.correction}[k]=-C_{FDRSB.post.eq}[k]$. This may yield an FDRSB free signal: $Y_{out}[k]=S[k](1-C_{FDRSB.post.eq}*[-k] C_{FDRSB.post.eq}[k])$. A residual gain of (1−squared FDRSB) is negligible, and may be captured and cancelled by an equalizer.

Based at least in part on transmitting the FDRSB training signal on subcarriers such that mirror subcarriers are vacant, estimation of FDRSB correction may be simplified, may conserve computing resources, may reduce overhead, and/or may conserve network and communication resources.

Figure 5:
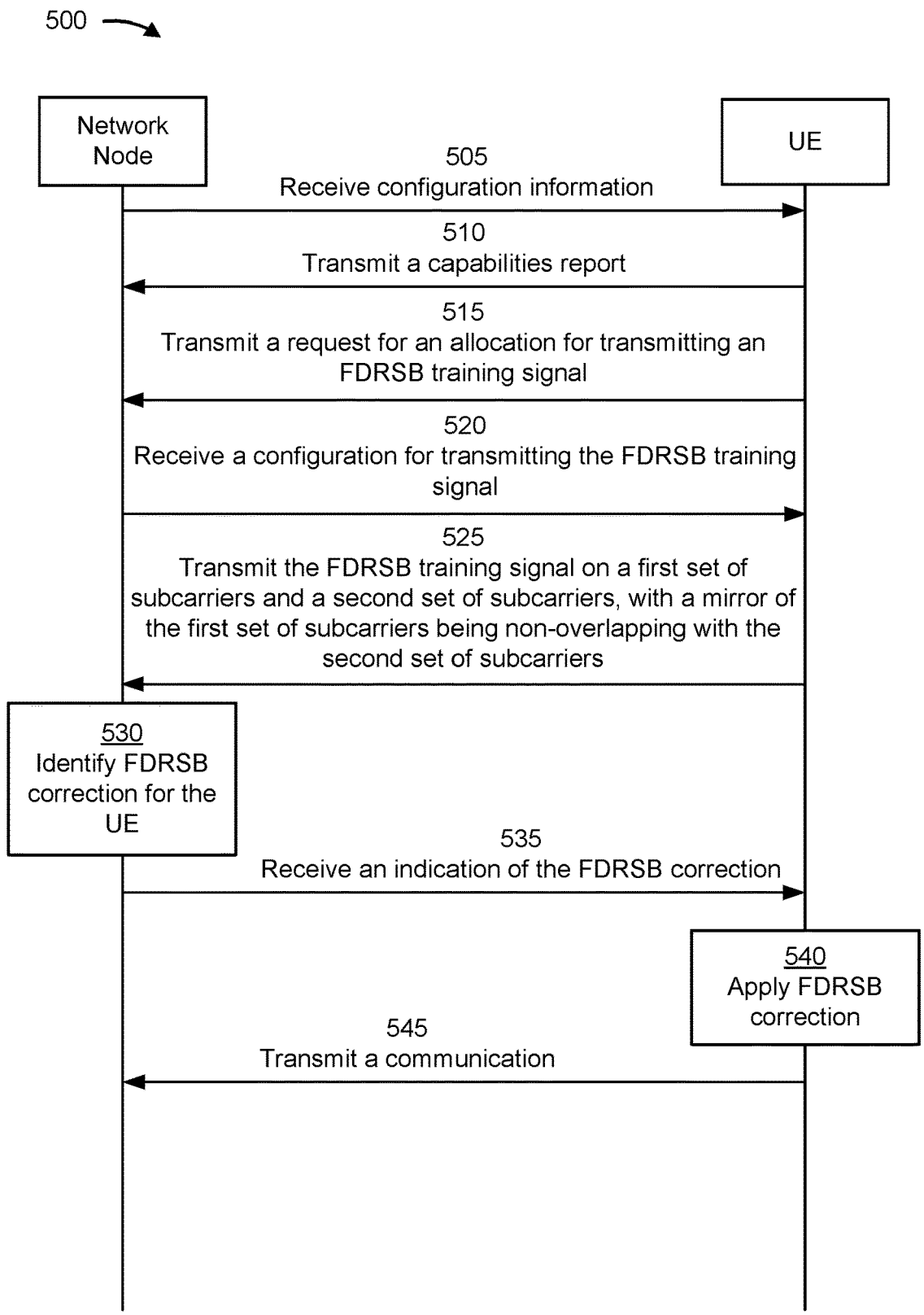
FIG. 5 is a diagram of an example associated with FDRSB correction, in accordance with the present disclosure.

FIG. 5 is a diagram of an example 500 associated with FDRSB correction, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5. In some aspects, the UE may include IQ modulators for transmitting modulated signals to the network node. The IQ modulators may cause FDRSB in transmitted signals.

As shown by reference number 505, the network node may transmit, and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit a request for an allocation for transmitting an FDRSB training signal. In some aspects, the configuration information may indicate that the UE is to request the allocation for transmitting the FDRSB training signal based at least in part on one or more conditions, such as a change in temperature, a change in channel conditions, a change in transmission beam, and/or a change in transmission power or other parameters, among other examples. In some aspects, the configuration information may indicate that the UE is to transmit the FDRSB training signal with vacancies on mirror subcarriers (e.g., subcarriers used to transmit the FDRSB training signal may have vacant and/or empty mirror subcarriers). In some aspects, the configuration information may indicate a pattern and/or resolution for transmitting the FDRSB training signal.

The UE may configure itself based at least in part on the configuration information. In some aspects, the UE may be configured to perform one or more operations described herein based at least in part on the configuration information.

As shown by reference number 510, the UE may transmit, and the network node may receive, a capabilities report. In some aspects, the capabilities report may indicate UE support for transmitting the FDRSB training signal with vacancies on mirror subcarriers. In some aspects, the capabilities report may indicate support for one or more candidate patterns and/or candidate resolutions for transmitting the FDRSB training signal.

As shown by reference number 515, the UE may transmit, and the network node may receive, a request for an allocation for transmitting an FDRSB training signal. In some aspects, the UE may transmit the request based at least in part on a change of channel conditions, temperature conditions, and/or beamforming parameters, among other examples.

As shown by reference number 520, the UE may receive, and the network node may transmit, a configuration for transmitting the FDRSB training signal. In some aspects, the network node may transmit the configuration based at least in part on receiving the request for described in connection with reference number 515. In some aspects, the network node may transmit the configuration independently from (e.g., in absence of) receiving the request described in connection with reference number 515. For example, the network node may transmit the configuration based at least in part on detecting a change in temperature, channel conditions, and/or beamforming parameters, among other examples.

In some aspects, the configuration may indicate selection of a pattern for transmitting the FDRSB training signal. For example, the configuration may indicate selection of a first pattern of the first set of subcarriers and/or a second pattern of the second set of subcarriers from a set of candidate subcarrier patterns for FDRSB training signals. In some aspects, the selection of the first pattern and/or or the second pattern is based at least in part on a selection by the UE or a selection by a network node associated with the FDRSB correction.

As shown by reference number 525, the UE may transmit, and the network node may receive, the FDRSB training signal on a first set of subcarriers and a second set of subcarriers, with a mirror of the first set of subcarriers being non-overlapping with the second set of subcarriers. Additionally, or alternatively, a mirror of the second set of subcarriers about the carrier frequency may be non-overlapping with the first set of subcarriers. For example, the UE may transmit the FDRSB training signal on a first set of subcarriers that are lower than a carrier frequency and on a second set of subcarriers that are higher than the carrier frequency, with a mirror of the first set of subcarriers about the carrier frequency being non-overlapping with the second set of subcarriers.

In some aspects, the mirror of the first set of subcarriers may be interleaved with the second set of subcarriers. In some aspects, a combination of the first set of subcarriers and the second set of subcarriers spans a first range of subcarriers that includes a second range of subcarriers on which the UE is configured to communicate with a network node associated with the FDRSB correction. For example, the UE may transmit the FDRSB training signal on the first set of subcarriers that is at least as wide as the second range of subcarriers and includes the second set of subcarriers such that the FDRSB training signal spans at least the frequency domain of UE transmissions.

In some aspects, the UE may use a pattern identified in the configuration for transmitting the FDRSB training signal, the configuration information, and/or in a communication protocol, among other examples. The pattern may have an even resolution (e.g., with a consistent spacing between subcarriers of the first set of subcarriers and/or between subcarriers of the second set of subcarriers) or with irregular spacing. The pattern may be configured with signal vacancy on subcarriers that are mirrors from subcarriers carrying the FDRSB training signal (e.g., the first set of subcarriers and the second set of subcarriers). For example, the UE may not transmit a signal on or may allocate no transmission power to the subcarriers that are mirrors from the subcarriers carrying the FDRSB training signal.

In some aspects, the UE may transmit the FDRSB training signal based at least in part on a periodicity for transmitting the FDRSB training signal, a request for FDRSB correction from a network node associated with the FDRSB correction, an update to one or more of a precoder or a beam used for a transmission to the network node, or an update to a temperature at the UE, among other examples. In some aspects, the periodicity may be based at least in part on a requested periodicity indicated by the UE, a configuration from the network node, a subcarrier spacing configured for communications associated with the FDRSB correction (e.g., a channel used for the communications), or a communication protocol, among other examples.

In some aspects, the UE may transmit the FDRSB training signal using a number of time resources that is based at least in part on a signal strength associated with communications between the UE and a network node associated with the FDRSB correction. For example, the UE may use multiple time resources for the FDRSB training signal based at least in part on a signal strength (e.g., SNR) failing to satisfy a threshold. Using multiple time resources may support processing gains that may improve coverage of the FDRSB training signal and/or improve accuracy of the FDRSB correction.

As shown by reference number 530, the network node may identify FDRSB correction for the UE. The network node may identify the FDRSB correction based at least in part on the FDRSB training signal.

As shown by reference number 535, the UE may receive, and the network node may transmit, an indication of the FDRSB correction. In some aspects, the indication of the FDRSB correction may indicate a filter or other processing parameters to apply to signals before transmitting, with the filter or other processing parameters configured to reduce FDRSB.

As shown by reference number 540, the UE may apply FDRSB correction. For example, the UE may apply a filter and/or other modification to a signal before transmitting the signal OTA. In some aspects, the UE may multiply a signal by a matrix that applies the FDRSB correction.

As shown by reference number 545, the UE may transmit, and the network node may receive, a communication based at least in part on application of the FDRSB correction. In some aspects, based at least in part on the application of the FDRSB correction, the network node may decode the communication with reduced errors, and/or reduced power and computing resources.

Based at least in part on transmitting the FDRSB training signal on subcarriers such that mirror subcarriers are vacant, estimation of FDRSB correction may be simplified, may conserve computing resources, may reduce overhead, and/or may conserve network and communication resources.

As indicated above, FIG. 5 is provided as an example. Other examples may differ from what is described with respect to FIG. 5.

Figure 6:
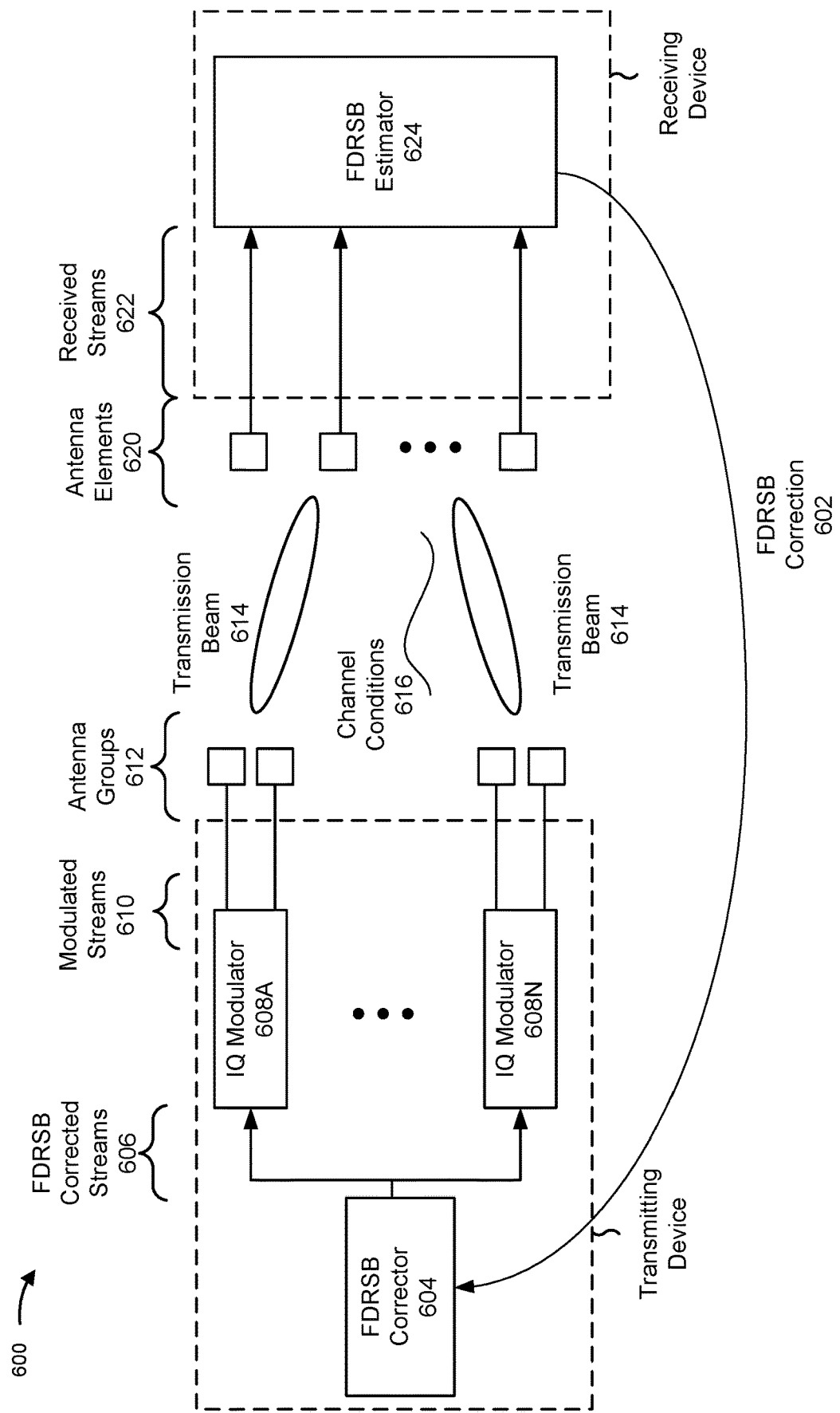
FIG. 6 is a diagram illustrating an example of a communication having FDRSB, in accordance with the present disclosure.

FIG. 6 is a diagram illustrating an example 600 of a communication having FDRSB, in accordance with the present disclosure. As shown in FIG. 6, a transmitting device may transmit a communication to a receiving device. The transmitting device may use multiple antenna elements (also referred to as "antennas") to transmit the communication using beamforming. The communication may include signals transmitted via multiple time-frequency resources (e.g., via multiple subcarriers and/or resource blocks on one or more symbols and/or slots).

As shown in FIG. 6, the transmitting device may receive FDRSB correction 602 from a receiving device. The FDRSB correction 602 may be based at least in part on an FDRSB training signal, as described herein. In some aspects, the UE may receive the FDRSB correction via a feedback communication transmitted by the receiving device.

The transmitting device may provide the FDRSB correction 602 to an FDRSB corrector 604. The FDRSB corrector may be configured to modify one or more streams before transmission to the receiving device. For example, the FDRSB corrector 604 may be configured to multiply the one or more streams by an FDRSB correction matrix. The one or more streams may include data and/or control signaling for transmission to the receiving device. The FDRSB corrector 604 may provide (e.g., directly or indirectly) FDRSB corrected streams 606 to a set of IQ modulators 608 (e.g., IQ modulators 608A through IQ modulators 608N). The IQ modulators 608 may modulate the FDRSB corrected streams 606 to map bits of the FDRSB corrected streams 606 to constellation points associated with bit values of the FDRSB corrected streams 606. For example, the IQ modulators 608 may apply modulation based at least in part on applying amplitudes, in a Q and an I dimension in an IQ plane, according to an MCS of communications to the receiving device. However, the IQ modulators 608 may cause FDRSB (e.g., an IQ mismatch, an FDRSB impairment, and/or FDRSB error) to the FDRSB corrected streams 606 based at least in part on, for example, imperfections of the FDRSB corrected streams 606. This FDRSB may cause signaling on a first subcarrier to interfere with a second subcarrier that is a mirror of the first subcarrier about a carrier frequency. For example, the first subcarrier may be a distance from the carrier frequency in a positive direction (e.g., above the carrier frequency), and the second subcarrier may be the same distance from the carrier frequency in a negative direction (e.g., below the carrier frequency).

The IQ modulators 608 may provide modulated streams 610 to antenna groups 612 for transmission over the air to the receiving device. Based at least in part on digital precoding, the antenna groups 612 may transmit the modulated streams 610 associated with the FDRSB corrected streams 606 via one or more transmission beams 614. In some examples, the antenna groups 612 may transmit the modulated streams 610 via one or more transmission beams 614. As the modulated streams 610 propagate over the air to the receiving device, channel conditions 616 may affect the modulated streams 610. For example, the channel conditions 616 may affect an SNR and/or an SINR of the modulated streams 610 as received at the receiving device.

The receiving device may receive the modulated streams 610 having effects from channel conditions 616. Additionally, based at least in part on transmission using the FDRSB corrector 604, FDRSB inserted by the IQ modulators 608 may be removed from the modulated streams 610. Antenna elements 620 may provide received streams 622 (e.g., the modulated signals having effects of channel conditions 616) to a demodulator and/or an FDRSB estimator 624. In some aspects, the FDRSB estimator 624 may be used to update the FDRSB correction 602. In some aspects, the FDRSB estimator 624 may be inactive based at least in part on the FDRSB correction 602 being active (e.g., based at least in part on age satisfying a threshold and/or not receiving an indication of a request to update). In these instances, the received streams 622 may be provided to a demodulator for demodulation and/or decoding of the received streams 622.

As indicated above, FIG. 6 is provided as an example. Other examples may differ from what is described with regard to FIG. 6.

Figure 7:
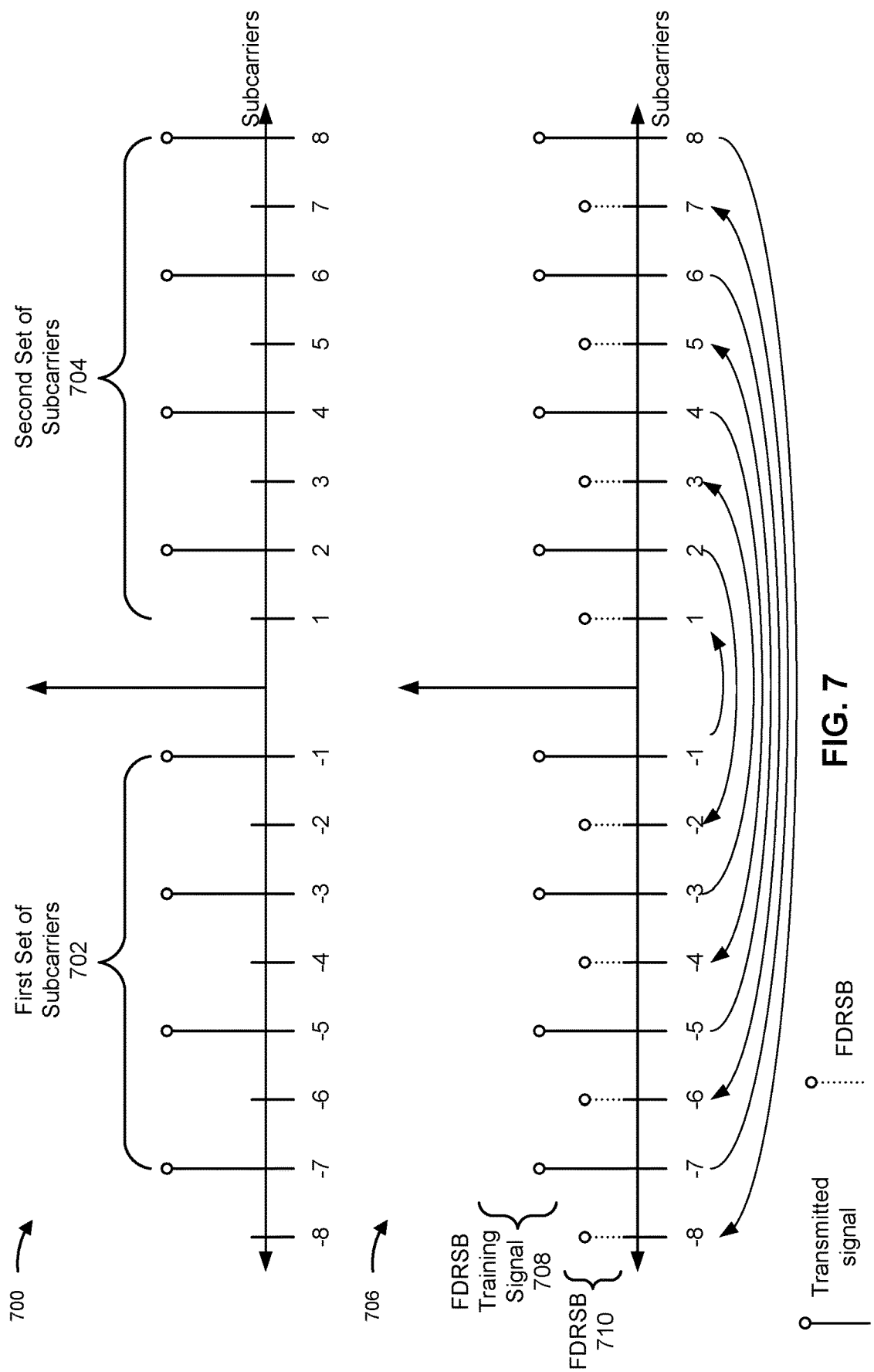
FIG. 7 is a diagram illustrating an example of an FDRSB pattern, in accordance with the present disclosure.

FIG. 7 is a diagram illustrating an example 700 of an FDRSB pattern, in accordance with the present disclosure. In some aspects, a transmitting device, such as a UE, may apply the FDRSB pattern for transmission of FDRSB training signals. As shown by reference number 700, the transmitting device may transmit FDRSB training signals on a first set of subcarriers 702 and a second set of subcarriers 704. A mirror of the first set of subcarriers 702 may be interleaved with the second set of subcarriers 704. In some aspects, the first set of subcarriers 702 may not occupy mirror subcarriers of the second set of subcarriers 704, and the second set of subcarriers 704 may not occupy mirror subcarriers of the first set of subcarriers 702.

As shown by reference number 706, a receiving device may sample the FDRSB training signals on the first set of subcarriers, a mirror of the first set of subcarriers 702, on the second set of subcarriers 704, and on the mirror of the second set of subcarriers 704 (mirrors shown with arrows as a same magnitude and opposite direction from a carrier frequency). The FDRSB training signal 708 may be observed on the first set of subcarriers 702 and on the second set of subcarriers 704. The FDRSB 710 (e.g., leakage from the FDRSB training signal 708 onto mirror subcarriers) may be observed on mirror subcarriers of the first set of subcarriers 702 and the second set of subcarriers 704. In this way, the receiving device may separate the FDRSB 710 from the FDRSB training signal 708 based at least in part on the FDRSB 710 being observed on different subcarriers than the FDRSB training signal 708.

As indicated above, FIG. 7 is provided as an example. Other examples may differ from what is described with regard to FIG. 7.

Figure 8:
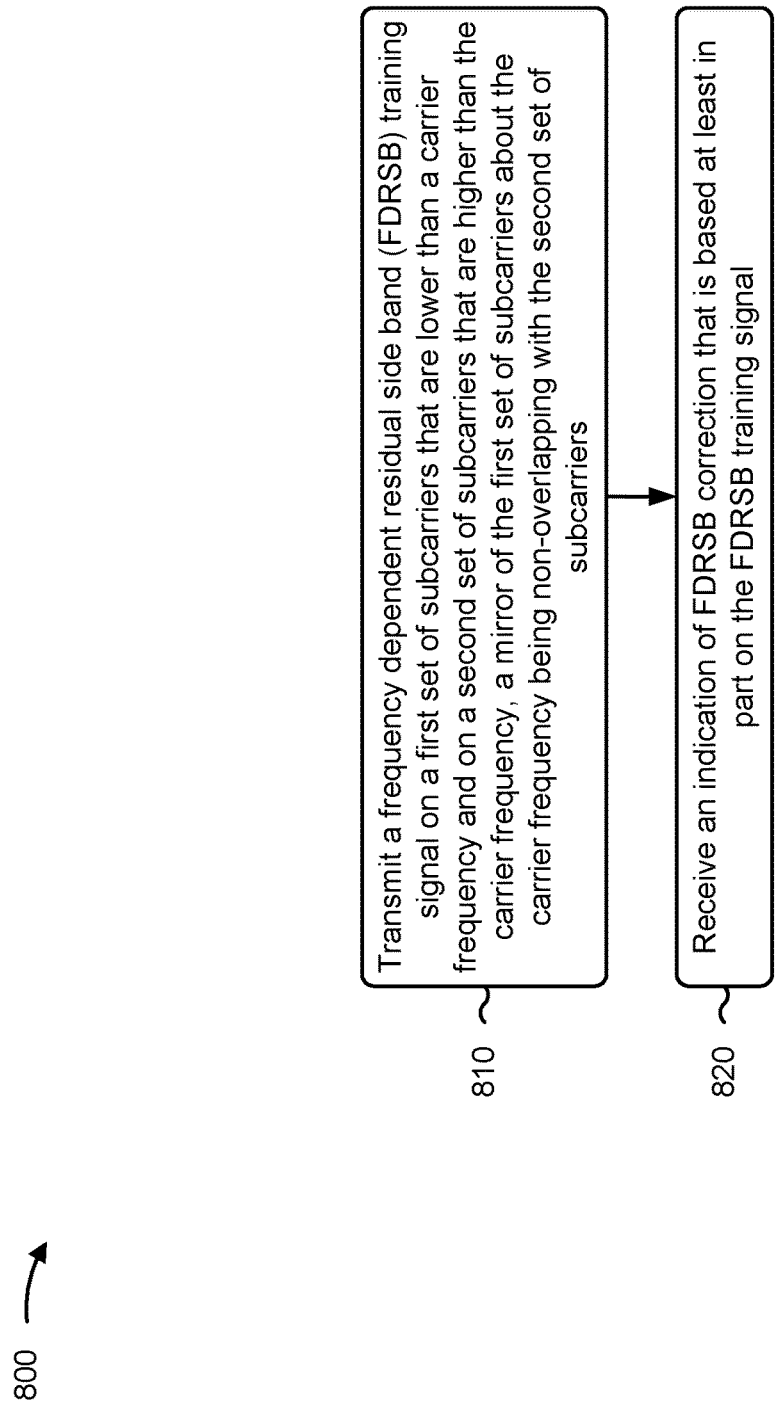
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with FDRSB correction.

As shown in FIG. 8, in some aspects, process 800 may include transmitting an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers (block 810). For example, the UE (e.g., using transmission component 1004 and/or communication manager 1006, depicted in FIG. 10) may transmit an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers, as described above.

As further shown in FIG. 8, in some aspects, process 800 may include receiving an indication of FDRSB correction that is based at least in part on the FDRSB training signal (block 820). For example, the UE (e.g., using reception component 1002 and/or communication manager 1006, depicted in FIG. 10) may receive an indication of FDRSB correction that is based at least in part on the FDRSB training signal, as described above.

Process 800 may include additional aspects, such as any single aspect or any combination of aspects described below and/or in connection with one or more other processes described elsewhere herein.

In a first aspect, the mirror of the first set of subcarriers is interleaved with the second set of subcarriers.

In a second aspect, alone or in combination with the first aspect, a combination of the first set of subcarriers and the second set of subcarriers spans a first range of subcarriers that includes a second range of subcarriers on which the UE is configured to communicate with a network node associated with the FDRSB correction.

In a third aspect, alone or in combination with one or more of the first and second aspects, a mirror of the second set of subcarriers about the carrier frequency is non-overlapping with the first set of subcarriers.

In a fourth aspect, alone or in combination with one or more of the first through third aspects, process 800 includes transmitting a request for an allocation for the FDRSB training signal, wherein transmission of the FDRSB training signal is based at least in part on transmission of the request.

In a fifth aspect, alone or in combination with one or more of the first through fourth aspects, process 800 includes receiving an indication of an allocation for the FDRSB training signal, wherein transmission of the FDRSB training signal is based at least in part on reception of the indication of the allocation.

In a sixth aspect, alone or in combination with one or more of the first through fifth aspects, transmission of the FDRSB training signal is based at least in part on one or more of a periodicity for transmitting the FDRSB training signal, a request for FDRSB correction from a network node associated with the FDRSB correction, an update to one or more of a precoder or a beam used for a transmission to the network node, or an update to a temperature at the UE.

In a seventh aspect, alone or in combination with one or more of the first through sixth aspects, the periodicity is based at least in part on one or more of a requested periodicity indicated by the UE, a configuration from the network node, a subcarrier spacing configured for communications associated with the FDRSB correction (e.g., a channel used for the communications), or a communication protocol.

In an eighth aspect, alone or in combination with one or more of the first through seventh aspects, a number of time resources used for transmission of the FDRSB training signal is based at least in part on a signal strength associated with communications between the UE and a network node associated with the FDRSB correction.

In a ninth aspect, alone or in combination with one or more of the first through eighth aspects, process 800 includes transmitting a communication to a network node associated with the FDRSB correction, wherein transmission of the communication comprises application of the FDRSB correction to the communication before transmission over the air.

In a tenth aspect, alone or in combination with one or more of the first through ninth aspects, one or more of a first pattern of the first set of subcarriers or a second pattern of the second set of subcarriers is selected from a set of candidate subcarrier patterns for FDRSB training signals, and wherein selection of the one or more of the first pattern or the second pattern is based at least in part on a selection by the UE or a selection by a network node associated with the FDRSB correction.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
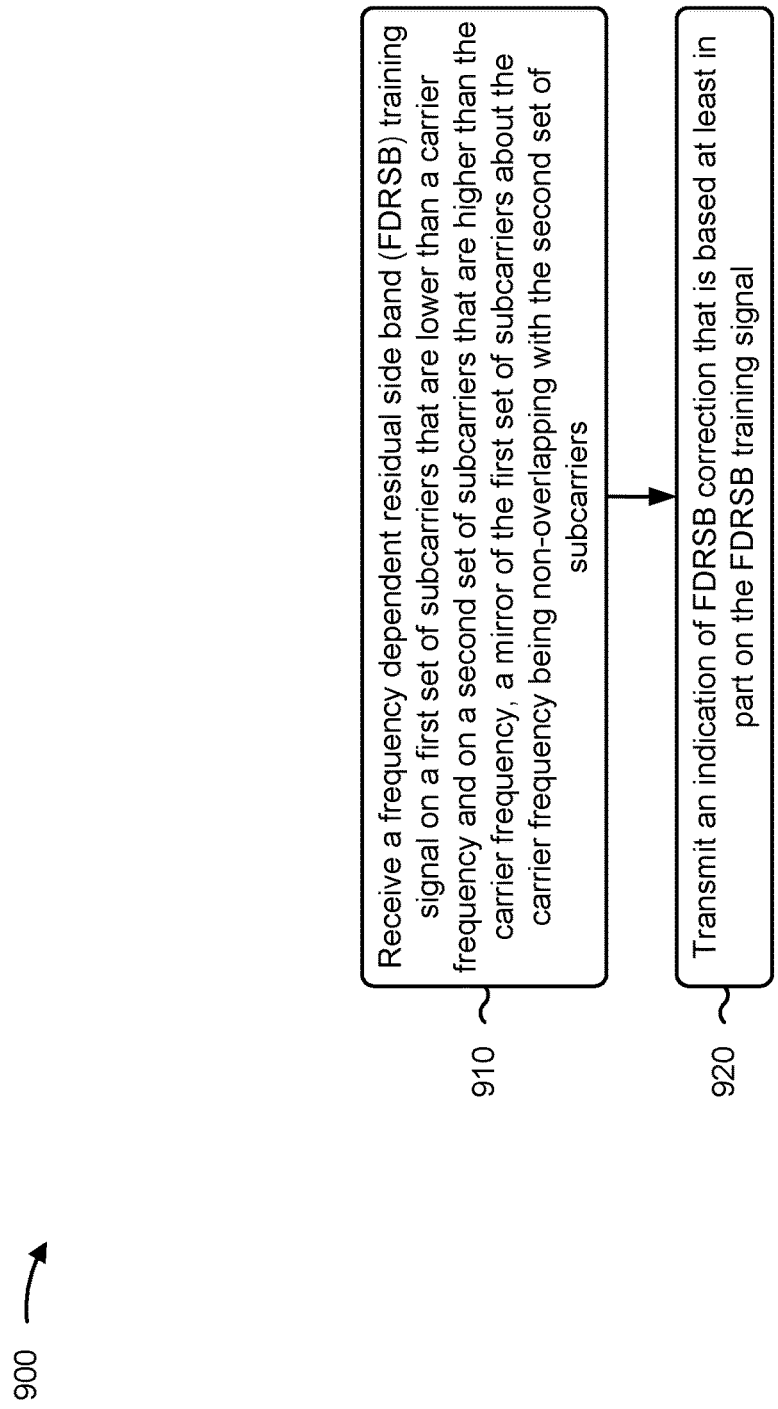
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with frequency dependent residual side band correction.

As shown in FIG. 9, in some aspects, process 900 may include receiving an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers (block 910). For example, the network node (e.g., using reception component 1102 and/or communication manager 1106, depicted in FIG. 11) may receive an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers, as described above.

As further shown in FIG. 9, in some aspects, process 900 may include transmitting an indication of FDRSB correction that is based at least in part on the FDRSB training signal (block 920). For example, the network node (e.g., using transmission component 1104 and/or communication manager 1106, depicted in FIG. 11) may transmit an indication of FDRSB correction that is based at least in part on the FDRSB training signal, as described above.

Process 900 may include additional aspects, such as any single aspect or any combination of aspects described below and/or in connection with one or more other processes described elsewhere herein.

In a first aspect, the mirror of the first set of subcarriers is interleaved with the second set of subcarriers.

In a second aspect, alone or in combination with the first aspect, a combination of the first set of subcarriers and the second set of subcarriers spans a first range of subcarriers that includes a second range of subcarriers on which the network node is configured to communicate with a UE associated with the FDRSB correction.

In a third aspect, alone or in combination with one or more of the first and second aspects, a mirror of the second set of subcarriers about the carrier frequency is non-overlapping with the first set of subcarriers.

In a fourth aspect, alone or in combination with one or more of the first through third aspects, process 900 includes receiving a request for an allocation for the FDRSB training signal, wherein reception of the FDRSB training signal is based at least in part on reception of the request.

In a fifth aspect, alone or in combination with one or more of the first through fourth aspects, process 900 includes transmitting an indication of an allocation for the FDRSB training signal, wherein reception of the FDRSB training signal is based at least in part on transmission of the indication of the allocation.

In a sixth aspect, alone or in combination with one or more of the first through fifth aspects, reception of the FDRSB training signal is based at least in part on one or more of a periodicity of the FDRSB training signal, a request for FDRSB correction by the network node, an update to one or more of a precoder or a beam used for a transmission to the network node, or an update to a temperature at a UE associated with the FDRSB correction.

In a seventh aspect, alone or in combination with one or more of the first through sixth aspects, the periodicity is based at least in part on one or more of a requested periodicity indicated by a UE associated with the FDRSB correction, a configuration from the network node, a subcarrier spacing configured for communications associated with the FDRSB correction (e.g., a channel used for the communications), or a communication protocol.

In an eighth aspect, alone or in combination with one or more of the first through seventh aspects, a number of time resources used for reception of the FDRSB training signal is based at least in part on a signal strength associated with communications between a UE associated with the FDRSB correction and the network node.

In a ninth aspect, alone or in combination with one or more of the first through eighth aspects, process 900 includes receiving a communication from a UE associated with the FDRSB correction, wherein the communication has FDRSB correction applied before transmission over the air.

In a tenth aspect, alone or in combination with one or more of the first through ninth aspects, one or more of a first pattern of the first set of subcarriers or a second pattern of the second set of subcarriers is selected from a set of candidate subcarrier patterns for FDRSB training signals, and wherein selection of the one or more of the first pattern or the second pattern is based at least in part on a selection by the network node or a selection by a UE associated with the FDRSB correction.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
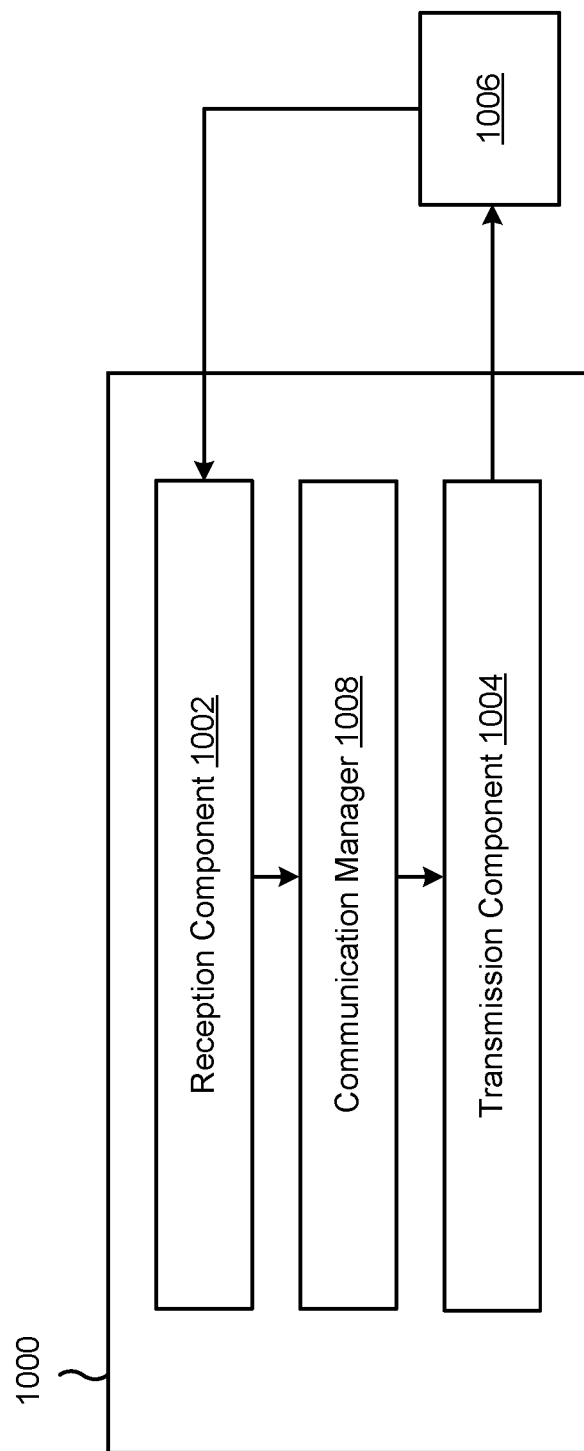
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008 (such as a UE, a base station, or another wireless communication device) using the reception component 1002 and the transmission component 1004.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The reception component 1002 may receive an indication of FDRSB correction that is based at least in part on the FDRSB training signal.

The transmission component 1004 may transmit a request for an allocation for the FDRSB training signal wherein transmission of the FDRSB training signal is based at least in part on transmission of the request.

The reception component 1002 may receive an indication of an allocation for the FDRSB training signal wherein transmission of the FDRSB training signal is based at least in part on reception of the indication of the allocation.

The transmission component 1004 may transmit a communication to a network node associated with the FDRSB correction wherein transmission of the communication comprises application of the FDRSB correction to the communication before transmission over the air.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
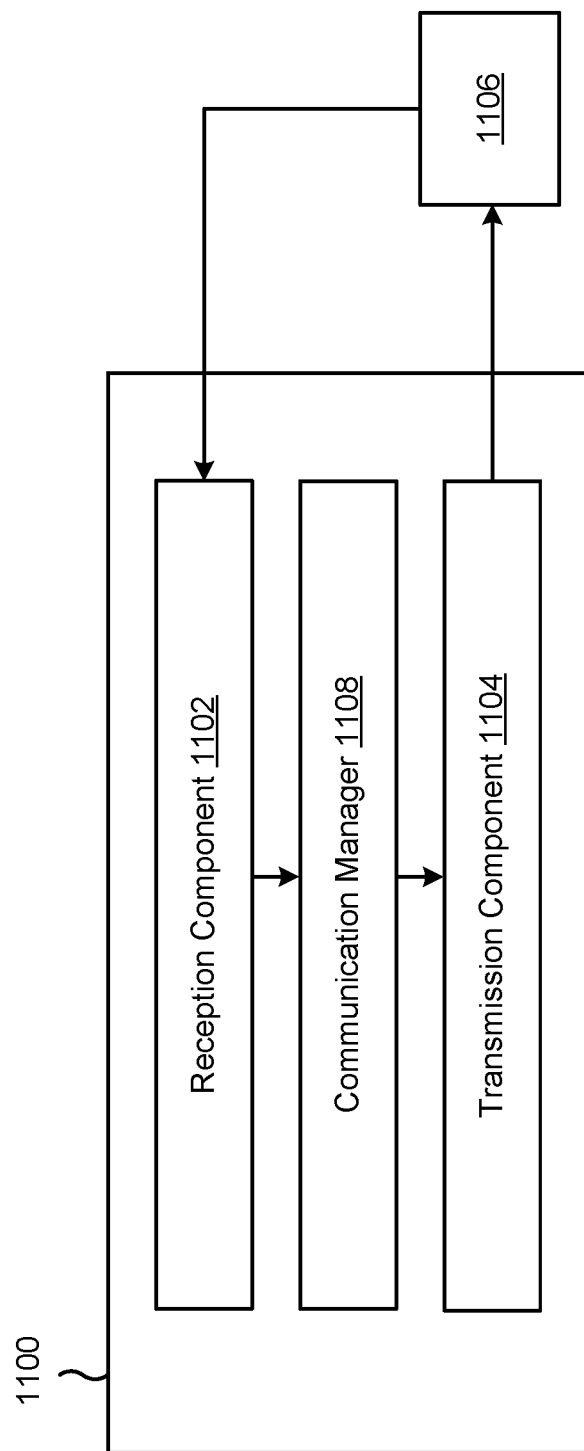
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108 (such as a UE, a base station, or another wireless communication device) using the reception component 1102 and the transmission component 1104.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive an FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The transmission component 1104 may transmit an indication of FDRSB correction that is based at least in part on the FDRSB training signal.

The reception component 1102 may receive a request for an allocation for the FDRSB training signal wherein reception of the FDRSB training signal is based at least in part on reception of the request.

The transmission component 1104 may transmit an indication of an allocation for the FDRSB training signal wherein reception of the FDRSB training signal is based at least in part on transmission of the indication of the allocation.

The reception component 1102 may receive a communication from a UE associated with the FDRSB correction wherein the communication has FDRSB correction applied before transmission over the air.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and receiving an indication of FDRSB correction that is based at least in part on the FDRSB training signal.

Aspect 2: The method of Aspect 1, wherein the mirror of the first set of subcarriers is interleaved with the second set of subcarriers.

Aspect 3: The method of any of Aspects 1-2, wherein a combination of the first set of subcarriers and the second set of subcarriers spans a first range of subcarriers that includes a second range of subcarriers on which the UE is configured to communicate with a network node associated with the FDRSB correction.

Aspect 4: The method of any of Aspects 1-3, wherein a mirror of the second set of subcarriers about the carrier frequency is non-overlapping with the first set of subcarriers.

Aspect 5: The method of any of Aspects 1-4, further comprising: transmitting a request for an allocation for the FDRSB training signal, wherein transmission of the FDRSB training signal is based at least in part on transmission of the request.

Aspect 6: The method of any of Aspects 1-5, further comprising: receiving an indication of an allocation for the FDRSB training signal, wherein transmission of the FDRSB training signal is based at least in part on reception of the indication of the allocation.

Aspect 7: The method of any of Aspects 1-6, wherein transmission of the FDRSB training signal is based at least in part on one or more of: a periodicity for transmitting the FDRSB training signal, a request for FDRSB correction from a network node associated with the FDRSB correction, an update to one or more of a precoder or a beam used for a transmission to the network node, or an update to a temperature at the UE.

Aspect 8: The method of Aspect 7, wherein the periodicity is based at least in part on one or more of: a requested periodicity indicated by the UE, a configuration from the network node, a subcarrier spacing configured for communications associated with the FDRSB correction, or a communication protocol.

Aspect 9: The method of any of Aspects 1-8, wherein a number of time resources used for transmission of the FDRSB training signal is based at least in part on a signal strength associated with communications between the UE and a network node associated with the FDRSB correction.

Aspect 10: The method of any of Aspects 1-9, further comprising transmitting a communication to a network node associated with the FDRSB correction, wherein transmission of the communication comprises application of the FDRSB correction to the communication before transmission over the air.

Aspect 11: The method of any of Aspects 1-10, wherein one or more of a first pattern of the first set of subcarriers or a second pattern of the second set of subcarriers is selected from a set of candidate subcarrier patterns for FDRSB training signals, and wherein selection of the one or more of the first pattern or the second pattern is based at least in part on a selection by the UE or a selection by a network node associated with the FDRSB correction.

Aspect 12: A method of wireless communication performed by a network node, comprising: receiving a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and transmitting an indication of FDRSB correction that is based at least in part on the FDRSB training signal.

Aspect 13: The method of Aspect 12, wherein the mirror of the first set of subcarriers is interleaved with the second set of subcarriers.

Aspect 14: The method of any of Aspects 12-13, wherein a combination of the first set of subcarriers and the second set of subcarriers spans a first range of subcarriers that includes a second range of subcarriers on which the network node is configured to communicate with a user equipment (UE) associated with the FDRSB correction.

Aspect 15: The method of any of Aspects 12-14, wherein a mirror of the second set of subcarriers about the carrier frequency is non-overlapping with the first set of subcarriers.

Aspect 16: The method of any of Aspects 12-15, further comprising: receiving a request for an allocation for the FDRSB training signal, wherein reception of the FDRSB training signal is based at least in part on reception of the request.

Aspect 17: The method of any of Aspects 12-16, further comprising: transmitting an indication of an allocation for the FDRSB training signal, wherein reception of the FDRSB training signal is based at least in part on transmission of the indication of the allocation.

Aspect 18: The method of any of Aspects 12-17, wherein reception of the FDRSB training signal is based at least in part on one or more of: a periodicity of the FDRSB training signal, a request for FDRSB correction by the network node, an update to one or more of a precoder or a beam used for a transmission to the network node, or an update to a temperature at a user equipment (UE) associated with the FDRSB correction.

Aspect 19: The method of Aspect 18, wherein the periodicity is based at least in part on one or more of: a requested periodicity indicated by a user equipment (UE) associated with the FDRSB correction, a configuration from the network node, a subcarrier spacing configured for communications associated with the FDRSB correction, or a communication protocol.

Aspect 20: The method of any of Aspects 12-19, wherein a number of time resources used for reception of the FDRSB training signal is based at least in part on a signal strength associated with communications between a user equipment (UE) associated with the FDRSB correction and the network node.

Aspect 21: The method of any of Aspects 12-20, further comprising receiving a communication from a user equipment (UE) associated with the FDRSB correction, wherein the communication has FDRSB correction applied before transmission over the air.

Aspect 22: The method of any of Aspects 12-21, wherein one or more of a first pattern of the first set of subcarriers or a second pattern of the second set of subcarriers is selected from a set of candidate subcarrier patterns for FDRSB training signals, and wherein selection of the one or more of the first pattern or the second pattern is based at least in part on a selection by the network node or a selection by a user equipment (UE) associated with the FDRSB correction.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of")

What is claimed is:

1. A user equipment (UE) for wireless communication, comprising:
   a memory; and
   one or more processors, coupled to the memory, configured to:
   transmit a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and receive an indication of FDRSB correction that is based at least in part on the FDRSB training signal.

2. The UE of claim 1, wherein the mirror of the first set of subcarriers is interleaved with the second set of subcarriers.

3. The UE of claim 1, wherein a combination of the first set of subcarriers and the second set of subcarriers spans a first range of subcarriers that includes a second range of subcarriers on which the UE is configured to communicate with a network node associated with the FDRSB correction.

4. The UE of claim 1, wherein a mirror of the second set of subcarriers about the carrier frequency is non-overlapping with the first set of subcarriers.

5. The UE of claim 1, wherein the one or more processors are further configured to:
   transmit a request for an allocation for the FDRSB training signal,
      wherein transmission of the FDRSB training signal is based at least in part on transmission of the request.

6. The UE of claim 1, wherein the one or more processors are further configured to:
   receive an indication of an allocation for the FDRSB training signal,
      wherein transmission of the FDRSB training signal is based at least in part on reception of the indication of the allocation.

7. The UE of claim 1, wherein transmission of the FDRSB training signal is based at least in part on one or more of:
   a periodicity for transmitting the FDRSB training signal,
   a request for FDRSB correction from a network node associated with the FDRSB correction,
   an update to one or more of a precoder or a beam used for a transmission to the network node, or
   an update to a temperature at the UE.

8. The UE of claim 7, wherein the periodicity is based at least in part on one or more of:
   a requested periodicity indicated by the UE,
   a configuration from the network node,
   a subcarrier spacing configured for communications associated with the FDRSB correction, or
   a communication protocol.

9. The UE of claim 1, wherein a number of time resources used for transmission of the FDRSB training signal is based at least in part on a signal strength associated with communications between the UE and a network node associated with the FDRSB correction.

10. The UE of claim 1, wherein the one or more processors are further configured to transmit a communication to a network node associated with the FDRSB correction,
   wherein transmission of the communication comprises application of the FDRSB correction to the communication before transmission over the air.

11. The UE of claim 1, wherein one or more of a first pattern of the first set of subcarriers or a second pattern of the second set of subcarriers is selected from a set of candidate subcarrier patterns for FDRSB training signals, and
   wherein selection of the one or more of the first pattern or the second pattern is based at least in part on a selection by the UE or a selection by a network node associated with the FDRSB correction.

12. A network node for wireless communication, comprising:
   a memory; and
   one or more processors, coupled to the memory, configured to:
      receive a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and
      transmit an indication of FDRSB correction that is based at least in part on the FDRSB training signal.

13. The network node of claim 12, wherein the mirror of the first set of subcarriers is interleaved with the second set of subcarriers.

14. The network node of claim 12, wherein a combination of the first set of subcarriers and the second set of subcarriers spans a first range of subcarriers that includes a second range of subcarriers on which the network node is configured to communicate with a user equipment (UE) associated with the FDRSB correction.

15. The network node of claim 12, wherein a mirror of the second set of subcarriers about the carrier frequency is non-overlapping with the first set of subcarriers.

16. The network node of claim 12, wherein the one or more processors are further configured to:
   receive a request for an allocation for the FDRSB training signal,
      wherein reception of the FDRSB training signal is based at least in part on reception of the request.

17. The network node of claim 12, wherein the one or more processors are further configured to:
   transmit an indication of an allocation for the FDRSB training signal,
      wherein reception of the FDRSB training signal is based at least in part on transmission of the indication of the allocation.

18. The network node of claim 12, wherein reception of the FDRSB training signal is based at least in part on one or more of:
   a periodicity of the FDRSB training signal,
   a request for FDRSB correction by the network node,
   an update to one or more of a precoder or a beam used for a transmission to the network node, or
   an update to a temperature at a user equipment (UE) associated with the FDRSB correction.

19. The network node of claim 18, wherein the periodicity is based at least in part on one or more of:
   a requested periodicity indicated by a user equipment (UE) associated with the FDRSB correction,
   a configuration from the network node,
   a subcarrier spacing configured for communications associated with the FDRSB correction, or
   a communication protocol.

20. The network node of claim 12, wherein a number of time resources used for reception of the FDRSB training signal is based at least in part on a signal strength associated with communications between a user equipment (UE) associated with the FDRSB correction and the network node.

21. The network node of claim 12, wherein the one or more processors are further configured to receive a communication from a user equipment (UE) associated with the FDRSB correction,
   wherein the communication has FDRSB correction applied before transmission over the air.

22. The network node of claim 12, wherein one or more of a first pattern of the first set of subcarriers or a second pattern of the second set of subcarriers is selected from a set of candidate subcarrier patterns for FDRSB training signals, and wherein selection of the one or more of the first pattern or the second pattern is based at least in part on a selection by the network node or a selection by a user equipment (UE) associated with the FDRSB correction.

23. A method of wireless communication performed by a user equipment (UE), comprising:

transmitting a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and receiving an indication of FDRSB correction that is based at least in part on the FDRSB training signal.

24. The method of claim 23, wherein a combination of the first set of subcarriers and the second set of subcarriers spans a first range of subcarriers that includes a second range of subcarriers on which the UE is configured to communicate with a network node associated with the FDRSB correction.

25. The method of claim 23, wherein a mirror of the second set of subcarriers about the carrier frequency is non-overlapping with the first set of subcarriers.

26. The method of claim 23, wherein transmission of the FDRSB training signal is based at least in part on one or more of:

a periodicity for transmitting the FDRSB training signal, a request for FDRSB correction from a network node associated with the FDRSB correction, an update to one or more of a precoder or a beam used for a transmission to the network node, or an update to a temperature at the UE.

27. A method of wireless communication performed by a network node, comprising:

receiving a frequency dependent residual side band (FDRSB) training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and transmitting an indication of FDRSB correction that is based at least in part on the FDRSB training signal.

28. The method of claim 27, wherein a combination of the first set of subcarriers and the second set of subcarriers spans a first range of subcarriers that includes a second range of subcarriers on which the network node is configured to communicate with a user equipment (UE) associated with the FDRSB correction.

29. The method of claim 27, wherein a mirror of the second set of subcarriers about the carrier frequency is non-overlapping with the first set of subcarriers.

30. The method of claim 27, wherein reception of the FDRSB training signal is based at least in part on one or more of:

a periodicity of the FDRSB training signal, a request for FDRSB correction by the network node, an update to one or more of a precoder or a beam used for a transmission to the network node, or an update to a temperature at a user equipment (UE) associated with the FDRSB correction.

* * * * *